(12) United States Patent
Li et al.

(10) Patent No.: US 10,460,152 B2
(45) Date of Patent: Oct. 29, 2019

(54) METHOD AND APPARATUS FOR PUSHING INFORMATION

(71) Applicant: BAIDU ONLINE NETWORK TECHNOLOGY (BEIJING) CO., LTD., Beijing (CN)

(72) Inventors: Yang Li, Beijing (CN); Jiawei Gu, Beijing (CN); Kai Yu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/322,504

(22) PCT Filed: Jun. 17, 2015

(86) PCT No.: PCT/CN2015/081695
§ 371 (c)(1),
(2) Date: Dec. 28, 2016

(87) PCT Pub. No.: WO2016/127538
PCT Pub. Date: Aug. 18, 2016

(65) Prior Publication Data
US 2018/0218199 A1    Aug. 2, 2018

(30) Foreign Application Priority Data

Feb. 10, 2015    (CN) .......................... 2015 1 0069649

(51) Int. Cl.
*G06K 9/00* (2006.01)
*G06F 16/2457* (2019.01)
(Continued)

(52) U.S. Cl.
CPC ......... *G06K 9/00275* (2013.01); *G05B 15/02* (2013.01); *G06F 3/011* (2013.01);
(Continued)

(58) Field of Classification Search
CPC .. G06K 9/0027; G06K 9/00228; G05B 15/02; G06F 17/30528; G06F 3/017;
(Continued)

(56) References Cited

U.S. PATENT DOCUMENTS

| | | | |
|---|---|---|---|
| 8,305,188 B2 | 11/2012 | Tran et al. | |
| 2015/0193718 A1* | 7/2015 | Shaburov | G06Q 10/06395 705/7.39 |
| 2015/0331668 A1* | 11/2015 | Huang | G06F 3/167 345/156 |

FOREIGN PATENT DOCUMENTS

| | | |
|---|---|---|
| CN | 102523502 A | 6/2012 |
| CN | 103729585 A | 4/2014 |

(Continued)

OTHER PUBLICATIONS

Huang, machine translation for CN 104038836, IDS, 2014.*
(Continued)

*Primary Examiner* — Qian Yang
(74) *Attorney, Agent, or Firm* — Lathrop Gage LLP

(57) ABSTRACT

Proposed are a method and apparatus for pushing information, the method comprises: detecting face information, and acquiring control information; acquiring pushing information according to the face information and the control information; and presenting the pushing information.

13 Claims, 3 Drawing Sheets

(51) Int. Cl.
  *G05B 15/02* (2006.01)
  *G06F 3/01* (2006.01)
  *G09B 5/06* (2006.01)
  *G09B 19/00* (2006.01)
  *G10L 15/22* (2006.01)
  *G06F 16/00* (2019.01)

(52) U.S. Cl.
  CPC .............. *G06F 3/017* (2013.01); *G06F 16/00* (2019.01); *G06F 16/24575* (2019.01); *G06K 9/00228* (2013.01); *G06K 9/00288* (2013.01); *G06K 9/00302* (2013.01); *G09B 5/065* (2013.01); *G09B 19/003* (2013.01); *G09B 19/0084* (2013.01); *G09B 19/0092* (2013.01); *G10L 15/22* (2013.01); *G10L 2015/223* (2013.01)

(58) Field of Classification Search
  CPC ....... G09B 5/065; G09B 19/003; G10L 15/22; G10L 2015/223
  See application file for complete search history.

(56) References Cited

FOREIGN PATENT DOCUMENTS

| | | | |
|---|---|---|---|
| CN | 104038836 A | | 9/2014 |
| CN | 104679839 A | | 6/2015 |
| JP | 2013-000300 | * | 1/2013 |
| WO | WO 2014/117647 | * | 1/2014 |

OTHER PUBLICATIONS

Khiat et al., machine translation for JP 2013-000300, 2013.*
Chinese Patent Application No. 201510069649.3 English Translation of the First Office Action dated Jul. 12, 2017, 8 pages.
Chinese Patent Application No. 201510069649.3 First Office Action dated Jul. 12, 2017, 7 pages.
PCT/CN2015/081695 English translation of the International Search Report & Written Opinion dated Nov. 12, 2015, 8 pages.
PCT/CN2015/081695 International Search Report & Written Opinion dated Nov. 12, 2015, 12 pages.

* cited by examiner

METHOD AND APPARATUS FOR PUSHING INFORMATION

CROSS-REFERENCE TO RELATED APPLICATION

This application claims priority to and benefits of Chinese Patent Application Serial No. 201510069649.3, entitled "Method and apparatus for pushing information", filed by Baidu online network technology (Beijing) CO., LTD., with the State Intellectual Property Office of P. R. China on Feb. 10, 2015, the entire content of which is incorporated herein by reference.

FIELD

The present disclosure relates to a field of information processing technology, and more particularly to a method and an apparatus for pushing information.

BACKGROUND

With the development of informatization, the face recognition technology has been applied more and more widely.

The existing applications based on the face recognition technology focus on the following three aspects: 1. the face recognition technology is applied in identity confirmation; 2. the face recognition technology is used for analyzing the matching and similarity between a face and a face of a celebrity, and searching a similar face; 3. the face recognition technology is used for conducting a virtual beautification on the original face, and achieving a recreational effect by exchanging faces.

However, the existing technology only recognizes a face image or creature feature information, and a face is treated as a unique information input, so that the output result is relatively single.

SUMMARY

Embodiments of the present disclosure seek to solve at least one of the problems existing in the related art to at least some extent.

Accordingly, an objective of the present disclosure is to provide a method for pushing information. The method may improve the diversity and individuation level of information pushing.

A second objective of the present disclosure is to provide an apparatus for pushing information.

A third objective of the present disclosure is to provide a storage medium.

A fourth objective of the present disclosure is to provide an information pushing equipment.

In order to achieve the above objectives, the method for pushing information according to embodiments of a first aspect of the present disclosure includes: detecting face information, and acquiring control information; acquiring pushing information according to the face information and the control information; and presenting the pushing information.

With the method for pushing information according to embodiments of the present disclosure, by detecting face information and acquiring control information, the face status may be recognized and analyzed, such that the pushing information may be acquired according to the face information and the control information, and various improvement advices for a user's status may be proposed, thus achieving diverse and personalized information pushing.

In order to achieve the above objectives, embodiments of a second aspect of the present disclosure provide an apparatus for pushing information. The apparatus includes: a detecting module, configured to detect face information, and acquire control information; an acquiring module, configured to acquire pushing information according to the face information and the control information; and a presenting module, configured to present the pushing information.

With the apparatus for pushing information according to embodiments of the present disclosure, by detecting face information and acquiring control information, the face status may be recognized and analyzed, such that pushing information may be acquired according to the face information and the control information, and various improvement advices for a user's status may be proposed, thus achieving diverse and personalized information pushing.

In order to achieve the above objectives, embodiments of a third aspect of the present disclosure provide a storage medium for storing an application program which is configured to execute the method for pushing information according to the embodiments of the first aspect of the present disclosure.

In order to achieve the above objectives, embodiments of a fourth aspect of the present disclosure provide an information pushing equipment. The information pushing equipment includes: one or more processors; memory; one or more modules stored in the memory, when executed by the one or more processors, performing following operations: detecting face information, and acquiring control information; acquiring pushing information according to the face information and the control information; and presenting the pushing information.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the accompanying drawings, in which.

DETAILED DESCRIPTION

Figure 1:
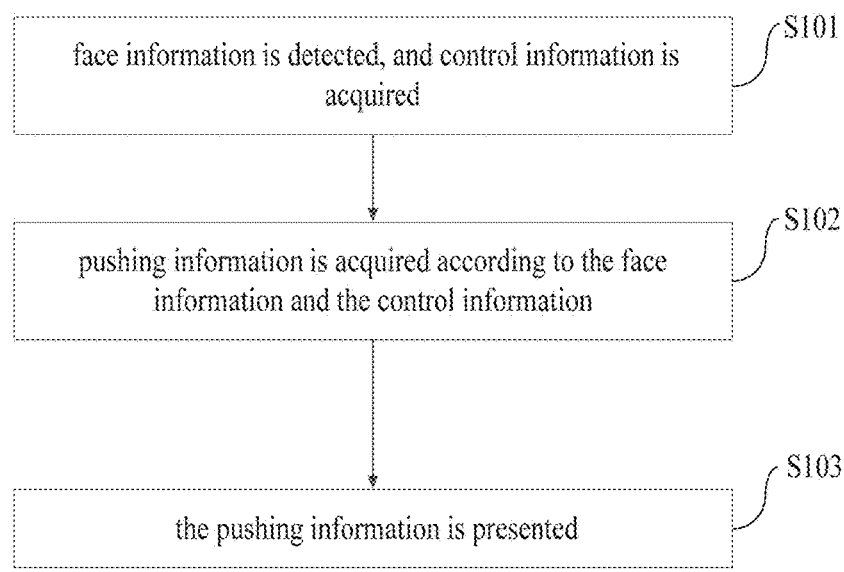
FIG. 1 is a flow chart of a method for pushing information according to an embodiment of the present disclosure.

Reference will be made in detail to embodiments of the present disclosure, where the same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure. Instead, the present disclosure covers all the modifications, equivalents and replacements within the spirit and technical scope of the present disclosure.

The method and apparatus for pushing information according to embodiments of the present disclosure will be described with reference to drawings.

FIG. 1 is a flow chart of a method for pushing information according to an embodiment of the present disclosure. The method includes followings.

In act S101, face information is detected, and control information is acquired;

Specifically, a face may be detected by a smart device configured with face detecting functionality.

The face information may be detected by the smart device though a camera set thereon, and the smart device may also acquire the control information through the camera and/or other modules.

Alternatively, the detected face information may be current face information that is detected in real time, or, the face information may also be long term data of face information in a preset time period.

The control information may include: gesture information, and/or, voice information, in which the gesture information may be acquired after a user's gesture is captured and recognized by the camera of the smart device, for example. The voice information may be acquired after user's voice is captured and recognized by a microphone of the smart device, for example.

Specifically, the face information may include: one or more of skin information, hair information, eye information, eyebrow information, nose information, tooth information, lip information, expression information and/or makeup information, etc.

The gesture information may include current status information corresponding to an automatically identified gesture (for example, the current status corresponding to an identified gesture is a tooth brushing status or a face massaging status) or gesture information in a command mode (for example, a command corresponding to a specific gesture may be preset, and when the specific gesture is detected, the command mode is entered into and the corresponding operation is executed according to the detected gesture command). For example, it is set in advance that the specific gesture of a hand stroking a full face indicates that the command is to open a full face detecting status, if a gesture of stroking a full face is captured, then an instruction of opening the full face detecting status is executed. If it is set in advance that the specific gesture of a finger pointing at a part indicates that the command is to zoom in this part and to conduct a detailed identification, and a finger points at a certain part specifically, an instruction of zooming in this part and conducting a detailed identification is executed.

The voice information may include: voice information in a command mode (for example, a command corresponding to specific voice content may be preset, and when the voice information with specific content is detected, the command mode is entered into) or voice information in a virtual conversation mode (for example, the voice content is "what if my eyes are bigger" "how to have smoother skin", and so on).

In act S102, pushing information is acquired according to the face information and the control information.

The pushing information may include at least one of basic information, recommended information and course information etc.

The basic information may include non-personal basic information and personal basic information. The non-personal basic information may include weather condition, headlines on today, due today, etc.; the personal information may include information such as data change and score of a face status, a current makeup, a sleeping quality etc.

The recommended information, for example, may be suggestions in the aspects of makeup, skin care, clothes, accessories, diet, exercise, environment, daily routine etc. formed according to the current situation, and a user may be guided to complete the suggestions through a before-and-after comparison.

The course information may include: a makeup course, a shaving course, face-washing, face-lift, massage and skin care products smearing courses, and tooth brushing course etc.

Specifically, the corresponding pushing information may be acquired according to the face information and the control information. For example, a score or a suggestion of sleeping quality is pushed according to the face information, the corresponding instructions may be executed according to the control information and the corresponding information may be pushed. For example, if the control information is gesture information, when the gesture information is the current status information corresponding to an automatically recognized gesture, for example when it is recognized that a tooth brushing status or a face massage status corresponds to the current gesture, a tooth brushing course or a face massage course, announcements or other information may be pushed; when the gesture information is gesture information in a command mode, for example, specifically, when a gesture of stroking a full face is detected, a full face detecting status is opened; or when a finger points at a certain part specifically, this part is zoomed in and a detailed identification is conducted. If the control information is voice information, when the voice information is voice information in a command mode, the corresponding operations may be executed according to the detected voice information command, for example, specifically, when the content of the detected voice information is "eye monitoring", "lip monitoring", the corresponding eye or lip monitoring mode is opened; when the voice information is voice information in a virtual conversation mode, for example, when it is detected that the voice content inputted by a user is "what if my eyes are bigger", a virtual effect of zooming in the eyes may be presented based on the current face status.

In act S103, the pushing information is presented.

Specifically, the pushing information may be presented in a static form such as text or an image, or in a dynamic form such as a voice or an animation. For example, the correct time and method for brushing teeth may be guided through an interesting way such as an interactive game. There are various specific presenting ways, which are not listed herein.

In the embodiment of the present disclosure, by detecting face information and acquiring control information, the face status may be recognized and analyzed, such that pushing information may be acquired according to the face information and the control information, and various improvement advices for a user's status may be proposed, thus achieving diverse and personalized information pushing.

Figure 2:
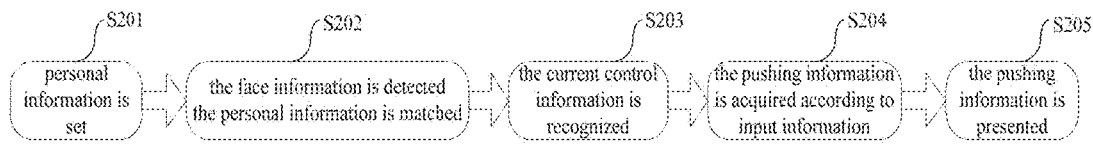
FIG. 2 is a flow chart of a method for pushing information according to another embodiment of the present disclosure.

FIG. 2 is a flow chart of a method for pushing information according to another embodiment of the present disclosure. The method includes followings.

In act S201, personal information is set.

Specifically, the embodiment may be implemented by a smart device configured with related function, such as Baidu magic mirror.

After the smart device is opened, a user may be prompted to log in. There are various ways to log in, which are not described herein. After the user logs in, the user may be prompted to set personal information. The personal information may be history information recorded in the smart device, or may be information inputted by the user manually or imported from other devices. For example, the personal information on other devices may be acquired by connecting to a network.

In act S202, the face information is detected and the personal information is matched.

Specifically, it may be preset that the face information may be automatically detected, and the detected face information may be matched with the personal information the user set so as to acquire the matched personal information. For example, a user may store his or her face information when setting the personal information. It should be understood that, the information of one or more users may be stored in a same smart device. After the smart device detects the face information, the detected face information may be compared with pre-stored face information of one or more users, so as to acquire the matched face information.

It should be understood that a smart device may store the face information currently detected after each matching, and acquire historical face information afterwards, so that long term data of face information in a preset time period may be collected.

In act S203, the current control information is recognized.

For example, the control information includes gesture information and voice information.

Figure 3:
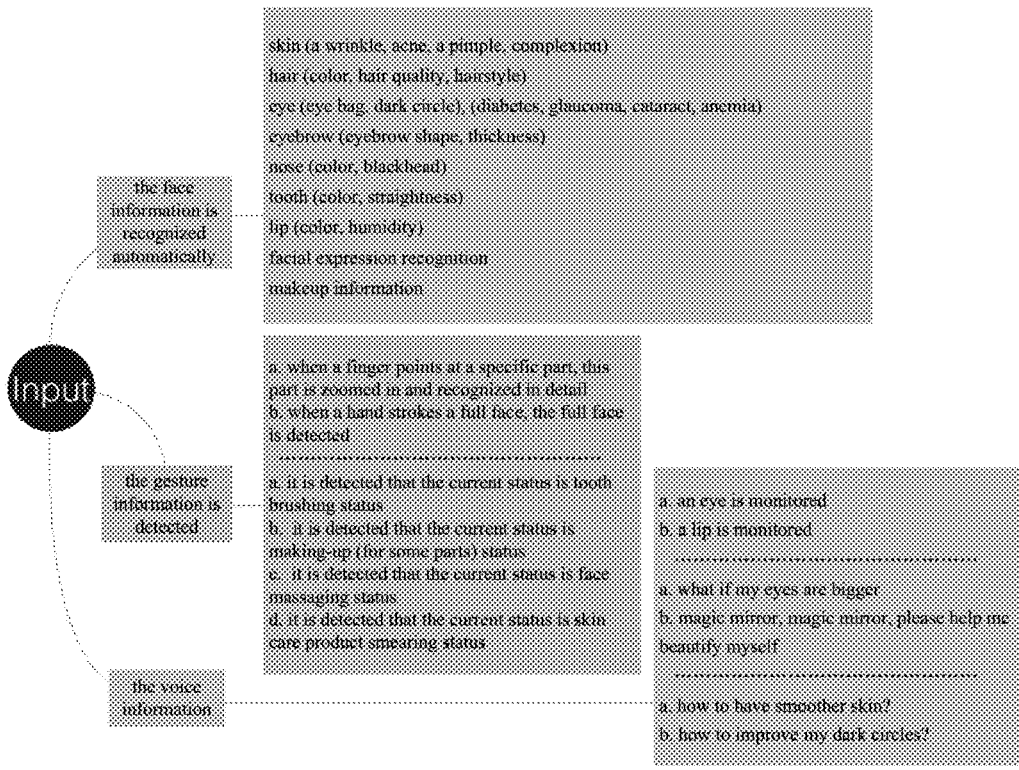
FIG. 3 is a schematic diagram showing input information of a smart device according to an embodiment of the present disclosure.

As shown in FIG. 3, input information of a smart device may include automatically recognized face information, gesture information and voice information. Reference may be made to FIG. 3, which is not listed herein.

In act S204, the pushing information is acquired according to input information.

Figure 4:
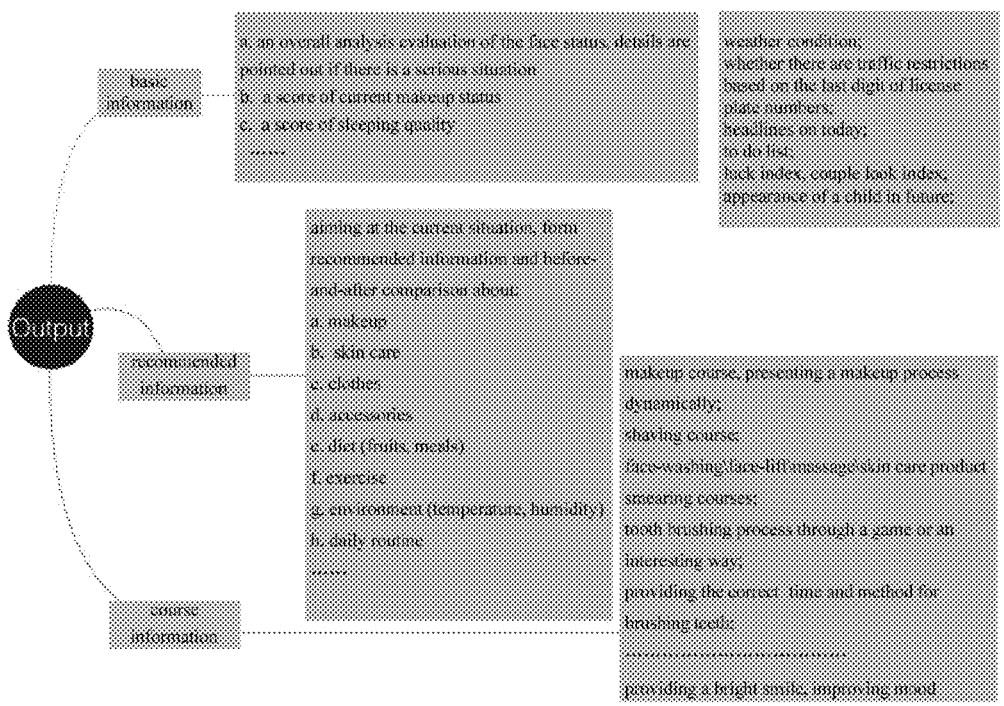
FIG. 4 is a schematic diagram showing pushing information output by a smart device according to an embodiment of the present disclosure.

As shown in FIG. 4, the pushing information may include basic information, recommended information, and course information etc. Specifically, there may be various kinds of information, which is not listed herein. In a specific embodiment, long term data of face information may be acquired through a long-time face detection, and the pushing information may be given according to the long term data. It should be understood that the relationship of the specific face information and control information with the pushing information may be determined according to a preset principle. For example, by analyzing the long term data of a face and determining the complexion is not well for a long time, the basic information which may be acquired includes information indicating that the sleeping quality is poor in this time period.

In act S205, the pushing information is presented.

For example, the pushing information is presented in one or more forms of text, an image, voice, etc.

In another embodiment, after face information is detected, an intelligent household electrical appliance may also be controlled according to the face information. For example, when a smart device detects that the skin humidity of a face is lower than a preset value, a humidifier may be controlled to be turned on for improving the humidity of air, or, when a smart device detects that the skin temperature of a face is higher than a preset value, an air conditioner may be controlled to be turned on for decreasing the temperature, and so on.

In this embodiment, by detecting the face information and acquiring the control information, the face status may be recognized and analyzed, such that the pushing information may be acquired according to the face information and the control information, and various suggestions for the user's status may be proposed, thus improving the quality of personalized information pushing and living quality of the user. Moreover, by collecting the long-term data of face information in a preset time period, statistic data and reasonable suggestions may be provided according to the change of face information so as to help user to improve the living details. Further, the intelligent household electrical appliance may be controlled according to the face information.

In order to implement the above embodiments, embodiments of the present disclosure further provide an apparatus for pushing information.

Figure 5:
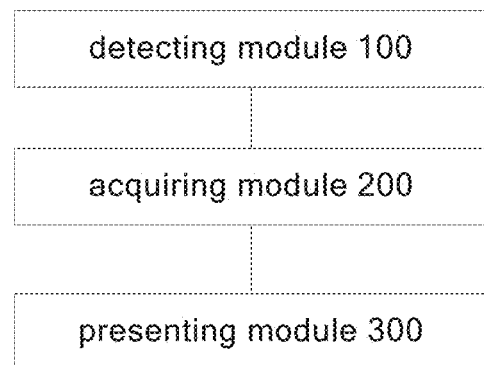
FIG. 5 is a block diagram of an apparatus for pushing information according to another embodiment of the present disclosure.

FIG. 5 is a block diagram of an apparatus for pushing information according to another embodiment of the present disclosure. As shown in FIG. 5, the apparatus for pushing information includes: a detecting module 100, an acquiring module 200 and a presenting module 300.

Specifically, the detecting module 100 is configured to detect face information and to acquire control information. More specifically, the detecting module 100 may detect a face through a smart device configured with face detecting functionality.

The face information may be detected by the smart device though a camera set thereon, and the smart device may also acquire the control information through the camera and/or other modules.

Alternatively, the detected face information may be current face information that is detected in real time, or, the face information may also be long term data of face information in a preset time period.

The control information may include: gesture information, and/or, voice information, in which the gesture information may be acquired after user's gestures are captured and recognized by the camera of the smart device, for example. The voice information may be acquired after user's voice is captured and recognized by a microphone of the smart device, for example.

More specifically, the face information may include: one or more of skin information, hair information, eye information, eyebrow information, nose information, tooth information, lip information, expression information and/or makeup information, etc.

The gesture information may include current status information corresponding to an automatically identified gesture (for example, the current status corresponding to an identified gesture is a tooth brushing status or a face massaging status) or gesture information in a command mode (for example, a command corresponding to a specific gesture may be preset, and when the specific gesture is detected, the command mode is entered into and the corresponding operation is executed according to the detected gesture command). For example, it is set in advance that the specific gesture of a hand stroking a full face indicates that the command is to open a full face detecting status, when a gesture of stroking a full face is captured, an instruction of opening the full face detecting status is executed. If it is set in advance that the specific gesture of a finger pointing at a part indicates that the command is to zoom in this part and to conduct a detailed identification, when a finger points at a certain part specifically, an instruction of zooming in this part and conducting a detailed identification is executed.

The voice information may include: voice information in a command mode (for example, a command corresponding to a specific voice content may be preset, and when the voice information with specific content is detected, the command mode is entered into) or voice information in a virtual conversation mode (for example, the voice content is "what if my eyes are bigger" "how to have smoother skin", and so on).

The acquiring module 200 is configured to acquire pushing information according to the face information and the control information, in which the pushing information may include at least one of basic information, recommended information and course information etc.

The basic information may include non-personal basic information and personal basic information. The non-personal basic information may include weather condition, headlines on today, plans on today, etc.; the personal information may include information such as data change and score of a face status, a current makeup, a sleeping quality etc.

The recommended information, for example, may be suggestions in the aspects of makeup, skin care, clothes, accessories, diet, exercise, environment, daily routine etc. formed aiming at the current situation, and a user may be guided to complete the suggestions through a before-and-after comparison.

The course information may include: a makeup course, a shaving course, face-washing, face-lift, massage and skin care products smearing courses, and tooth brushing course etc.

More specifically, the acquiring module 200 may acquire the corresponding pushing information according to the face information and the control information. For example, a score or a suggestion of sleeping quality is pushed according to the face information, the corresponding instructions may be executed according to the control information and the corresponding information may be pushed. For example, if the control information is gesture information, when the gesture information is the current status information corresponding to an automatically recognized gesture, for example when it is recognized that a tooth brushing status or a face massage status corresponds to the current gesture, a tooth brushing course or a face massage course, an announcement or other information may be pushed; when the gesture information is gesture information in a command mode, for example, specifically, when a gesture of stroking a full face is detected, a full face detecting status is opened; or when a finger points at a certain part specifically, this part is zoomed in so as to conduct a detailed identification. If the control information is voice information, when the voice information is voice information in a command mode, the corresponding operations may be executed according to the detected voice information command, for example, specifically, when the content of the detected voice information is "eye monitoring", "lip monitoring", the corresponding eye or lip monitoring mode is opened; if the voice information is voice information in a virtual conversation mode, for example, when it is detected that the voice content inputted by a user is "what if my eyes are bigger", a virtual effect of zooming in the eyes may be presented based on the current face status.

The presenting module 300 is configured to present the pushing information. More specifically, the pushing information may be presented in a static form such as a text or an image, or in a dynamic form such as a voice or an animation. For example, the correct time and method for brushing teeth may be guided through an interesting way such as an interactive game. There are various specific presenting ways, which are not listed herein.

In the embodiment of the present disclosure, by detecting face information and acquiring control information, the face status may be recognized and analyzed, such that pushing information may be acquired according to the face information and the control information, and various improvement advices for a user's status may be proposed, thus achieving diverse and personalized information pushing.

Figure 6:
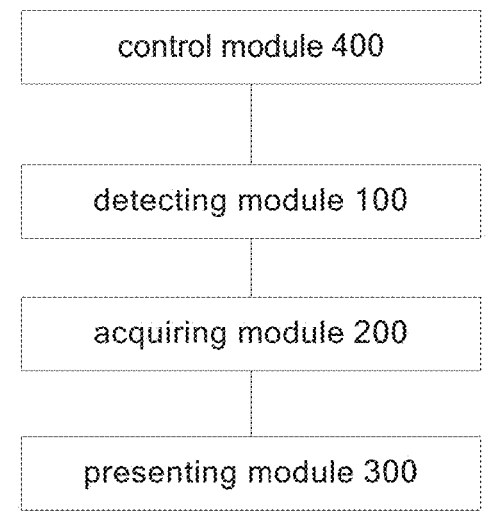
FIG. 6 is a block diagram of an apparatus for pushing information according to another embodiment of the present disclosure.

FIG. 6 is a block diagram of an apparatus for pushing information according to another embodiment of the present disclosure. As shown in FIG. 6, the apparatus for pushing information includes: a detecting module 100, an acquiring module 200, a presenting module 300 and a control module 400.

Specifically, the embodiment may be implemented by a smart device configured with related function, such as Baidu magic mirror.

After the smart device is opened, a user may be prompted to log in. There are various ways to log in, which are not described herein. After the user logs in, the user may be prompted to set personal information. The personal information may be history information recorded in the smart device, or may be information inputted by the user manually or imported from other devices. For example, the personal information on other devices may be acquired by connecting to a network.

More specifically, it may be preset that the face information may be automatically detected, and the detected face information may be matched with the personal information the user set so as to acquire the matched personal information. For example, a user may store his or her face information when setting the personal information. It should be understood that, the information of one or more users may be stored in a same smart device. After the smart device detects the face information, the detected face information may be compared with pre-stored face information of one or more users, so as to acquire the matched face information.

It should be understood that a smart device may store the current detected face information after each matching, and acquire historical face information afterwards, so that long term data of face information in a preset time period may be collected.

Based on the above embodiment, the apparatus for pushing information further includes the control module 400 configured to control an intelligent household electrical appliance according to the face information. For example, when the detecting module 100 detects that the skin humidity of a face is lower than a preset value, the control module 400 may control a humidifier to be turned on for improving the humidity of air, or, when the detecting module 100 detects that the skin temperature of a face is higher than a preset value, the control module 400 may control an air conditioner to be turned on for decreasing the temperature, and so on.

In this embodiment, by detecting face information and acquiring control information, recognizing and analyzing the face status, pushing information may be acquired according to the face information and the control information, and various improvement advices for a user's status may be proposed, such that the quality of personalized information pushing and the quality of a user's life may be improved. In addition, by collecting long term data of face information in a preset time period, statistic data and reasonable suggestions may be provided according to the change of face information, which are helpful to improve user's living details. Additionally, a control of an intelligent household electrical appliance may be realized according to the face information.

In order to implement the above embodiments, the present disclosure further provides a storage medium for storing an application program which is configured to execute the method for pushing information according to any of embodiments of the present disclosure.

In order to implement the above embodiments, the present disclosure further provides an information pushing equipment which includes one or more processors, memory, and one or more modules. The one or more modules are stored in the memory, when executed by the one or more processors, the following operations are performed.

In act S101', face information is detected, and control information is acquired.

In act S102', pushing information is acquired according to the face information and the control information.

In act S103', the pushing information is presented.

Reference throughout this specification to "one embodiment", "some embodiments," "an embodiment", "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, in a case without contradictions, different embodiments or examples or features of different embodiments or examples may be combined by those skilled in the art.

Additionally, those skilled in the art shall understand that terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more, unless specified otherwise.

It will be understood that, the flow chart or any process or method described herein in other manners may represent a module, segment, or portion of code that comprises one or more executable instructions to implement the specified logic function(s) or that comprises one or more executable instructions of the steps of the progress. And the scope of a preferred embodiment of the present disclosure includes other implementations in which the order of execution may differ from that which is depicted in the flow chart, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that the various parts of the present disclosure may be realized by hardware, software, firmware or combinations thereof. In the above embodiments, a plurality of steps or methods may be stored in a memory and achieved by software or firmware executed by a suitable instruction executing system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable memory medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable memory medium.

The above-mentioned memory medium may be a read-only memory, a magnetic disc, an optical disc, etc. Although explanatory embodiments have been shown and described, it would be appreciated that the above embodiments are explanatory and cannot be construed to limit the present disclosure, and changes, alternatives, and modifications can be made in the embodiments without departing from scope of the present disclosure by those skilled in the art.

What is claimed is:

1. A method for pushing information, comprising:
   detecting face information by a smart device;
   detecting, by the smart device, at least one hand of a user;
   recognizing, by the smart device, the at least one hand of the user to acquire a hand gesture;
   determining, by the smart device, whether the hand gesture matches with a preset hand gesture;
   when determining that the hand gesture matches with the preset hand gesture, acquiring, by the smart device, a control instruction based on the hand gesture, wherein a correspondence between the preset hand gesture and the control instruction is preset;

acquiring pushing information by the smart device according to the face information and the control instruction, wherein a relationship of the face information, control instruction, and the pushing information is pre-determined; and presenting the pushing information by the smart device in one or more forms of text, an image, and voice;

after detecting the face information by the smart device, the method further comprises:

when detecting by the smart device that the face information meets a preset condition, controlling the intelligent household electrical appliance to perform a corresponding operation by the smart device according to the face information.

2. The method according to claim 1, wherein detecting face information comprises:

collecting long term data of face information in a preset time period.

3. The method according to claim 2, after detecting face information, further comprising:

controlling an intelligent household electrical appliance according to the face information.

4. The method according to claim 2, wherein acquiring control instruction comprises:

acquiring voice information.

5. The method according to claim 1, wherein acquiring control instruction comprises:

acquiring voice information.

6. The method according to claim 5, wherein the voice information comprises at least one of:

voice information in a command mode; and
voice information in a virtual conversation mode.

7. The method according to claim 1, wherein the pushing information comprises at least one of:

basic information, recommended information and course information.

8. An apparatus for pushing information, comprising:
a processor; and
a memory, configured to store instructions executable by the processor;
wherein, the processor is configured to:
detect face information,
detect at least one hand of a user;
recognize the at least one hand of the user to acquire a hand gesture,
determine whether the hand gesture matches with a preset hand gesture,
when determining that the hand gesture matches with the preset hand gesture, acquire a control instruction, wherein a correspondence between the preset hand gesture and the control instruction is prese;

acquire pushing information according to the face information and the control instruction, wherein a relationship of the face information, control instruction, and the pushing information is pre-determined,
present the pushing instruction in one or more forms of text, an image, and voice, and
when detecting that the face information meets a preset condition, control the intelligent household electrical appliance to perform a corresponding operation according to the face information.

9. The apparatus according to claim 8, wherein the processor is further configured to detect face information by collecting long term data of face information in a preset time period.

10. The apparatus according to claim 8, wherein the processor is further configured to acquire control instruction by acquiring voice information.

11. The apparatus according to claim 10, wherein the voice information comprises at least one of:

voice information in a command mode; and
voice information in a virtual conversation mode.

12. The apparatus according to claim 8, wherein the pushing information comprises at least one of:

basic information, recommended information and course information.

13. A non-transitory computer storage medium having one or more programs stored therein, wherein when executed by a terminal, the one or more programs cause the terminal to:

detect face information,
detect at least one hand of a user;
recognize the at least one hand of the user to acquire a hand gesture;
determine whether the hand gesture matches with a preset hand gesture;
when determining that the hand gesture matches with the preset hand gesture, acquiring a control instruction, wherein a correspondence between the preset hand gesture and the control instruction is preset;
acquire pushing information according to the face information and the control instruction, wherein a relationship of the face information, control instruction, and the pushing information is pre-determined; and
present the pushing information in one or more forms of text, an image, and voice;
wherein when executed by the terminal, the one or more programs further cause the terminal to:
when detecting that the face information meets a preset condition, controlling the intelligent household electrical appliance to perform a corresponding operation according to the face information.

* * * * *